United States Patent [19]
Pugsley

[11] 3,894,178
[45] July 8, 1975

[54] IMAGE REPRODUCTION METHOD AND APPARATUS

[75] Inventor: Peter C. Pugsley, Pinner, England

[73] Assignee: Crosfield Electronics Limited, London, England

[22] Filed: Nov. 13, 1973

[21] Appl. No.: 415,428

[30] Foreign Application Priority Data
Nov. 13, 1972 United Kingdom .............. 52351/72

[52] U.S. Cl. .................. 178/6; 178/DIG. 6; 358/80
[51] Int. Cl. .............................................. H04n 1/38
[58] Field of Search ............. 178/DIG. 6, 6; 358/80, 358/75, 78

[56] References Cited
UNITED STATES PATENTS

| | | | |
|---|---|---|---|
| 3,194,883 | 7/1965 | Ross | 358/80 |
| 3,275,741 | 9/1966 | Hughes | 358/75 |
| 3,557,303 | 1/1971 | Jordan | 358/80 |

*Primary Examiner*—Howard W. Britton
*Assistant Examiner*—Michael A. Masinick
*Attorney, Agent, or Firm*—Kemon, Palmer & Estabrook

[57] ABSTRACT

In image reproduction, joins between different parts of a montage to be reproduced, or other defects in an image, are painted over with fluorescent paint. The image is then scanned with a normal aperture, point by point, to generate density-representing signals and is additionally scanned with a larger aperture to generate further signals. A threshold circuit receiving these further signals is responsive to signals of a level such as to indicate the presence of fluorescent paint within the view of the larger aperture and is operative to substitute for the output of the normal-aperture scanner a signal of predetermined value representing white or a background colour. Thus the defect-representing signals are replaced by the background signals.

6 Claims, 3 Drawing Figures

IMAGE REPRODUCTION METHOD AND APPARATUS

This invention is concerned with the reproduction of images by a process involving point-by-point scanning of an original to be reproduced. In such a process, the original is scanned by means of an analysing head including a photo-electric device from which there is derived an electric signal the value of which at any instant depends upon the density of the point of the original which is being scanned at that instant. The signal is used to control an image-reproducing device which scans an output surface with a similar scanning pattern and which may include an exposing light source, for use with a light-sensitive output surface, or may include an engraving device. In colour reproduction, the analysing head includes colour filters and a number of photo-electric devices, so arranged that different electric signals are derived for different colour-component densities of the original.

In image reproduction, it is sometimes required to modify an area of the original or some particular hue in an area of the original. To achieve this, it is known to mark a second input surface (the original constituting the first input surface) so as to demarcate the area within which the reproduction of the original is to be altered; the second input surface is scanned by a second scanning head, synchronously with the scanning of the original by the first scanning head, and whereever the output of the second scanning head indicates that the heads are scanning the predetermined area, the output of the first scanning head may be modified. For example, the output of the first scanning head might be replaced by a predetermined "background" colour, leaving an area for a caption, or all hues within that area might be modified to give different colour values, or selected hues within that area might be modified, as described in our U.S. Pat. No. 3,739,078.

The original may include a defect which has to be omitted in the reproduction, one example of this being when the material to be reproduced consists of a number of different sections between which there are joins, for example when it is a montage of text and pictures; this may be made up in page form in reflection material such as bromide prints and photographic colour prints, for example. The resulting montage is scanned, for example on a drum scanner, and the output signals are used to control the preparation of the reproduction. The effect in the reproduced copy of the joins in the original may be reduced by painting over the joins in the original but in many cases the joins cannot be satisfactorily concealed with white paint.

The present invention is concerned with preventing the joins between the elements of the montage from showing in the finished work. It may however also be used for preventing the reproduction of other defects occuring in white or other background area of the material to be reproduced.

The present invention is thus concerned with apparatus for use in the reproduction of an original, including a scanner having photo-electric means for scanning an original point by point with a first aperture to provide a signal representing the density values of successively scanned points on the original image, the image-representing signal constituting a control signal for a scanning image-reproduction device; according to the present invention, the apparatus additionally comprises second photo-electric means for scanning the said original with a second aperture larger than the first aperture, and means operative to replace the said image-representing signal for a scanned point on the original by a signal having a predetermined value in response to a signal from the second photo-electric means having a value distinguishable from the image-representing signals for an area of the original including the said scanned point, whereby when defects in the original are so painted that they result in a distinguishable signal from the said second photo-electric means, the signal of predetermined value constitutes the control signal for the scanning image-reproduction device for the said point and the defects are omitted from the reproduction. The signal of predetermined value will usually represent white or some other background colour which will merge with the surrounding area. Thus, in a method embodying the present invention, joins or other defects in the original are painted over with a fluorescent paint in a preliminary step and the sensing of the fluorescent paint results in the said distinguishable signal.

In this way, when the area of the original which is being scanned through the smaller aperture includes a join which has not been completely obscured, provided that fluorescent paint has adhered to the original in the neighbourhood of the join, close enough to be within the corresponding area scanned through the larger aperture, the join will not be reproduced at the scanner output.

References to fluorescent paint in this specification are to be understood as including substances which resemble ink rather than paint. The fluorescent paint chosen is one which, when excited by suitable radiation, will fluoresce in such a manner that the radiation from it in a chosen part of the spectrum is substantially greater than the radiation scattered by the white paper of the original. Typically, a paint would be used which, when excited by white light containing a high proportion of ultra-violet, fluoresces strongly in the red part of the spectrum.

To carry out the process described above, the scanner requires a second photo-electric device scanning through a larger aperture and a threshold circuit responsive to signals from this photo-electric device of a level indicating the sensing of fluorescent paint to provide a control signal for overriding the normal output of the smaller-aperture photo-electric device.

The drum scanner is provided with a means of illumination which will excite the chosen fluorescence, and is otherwise suitable for reflection copy illumination. A xenon arc lamp and an optical system transmitting visible and near-UV radiation are suitable. The larger aperture photo-electric device may be responsive to an annular region around the point scanned through the smaller-aperture or it may be responsive to an area larger than and including the element scanned through the smaller aperture; the photo-electric device with the larger aperture is preferably preceded by filters such that its greatest response is at the wavelength of greatest fluorescence of the chosen paint.

In order that the invention may be better understood, some examples of apparatus embodying the invention will now be described with reference to the accompanying drawings, in which.

Figure 1:
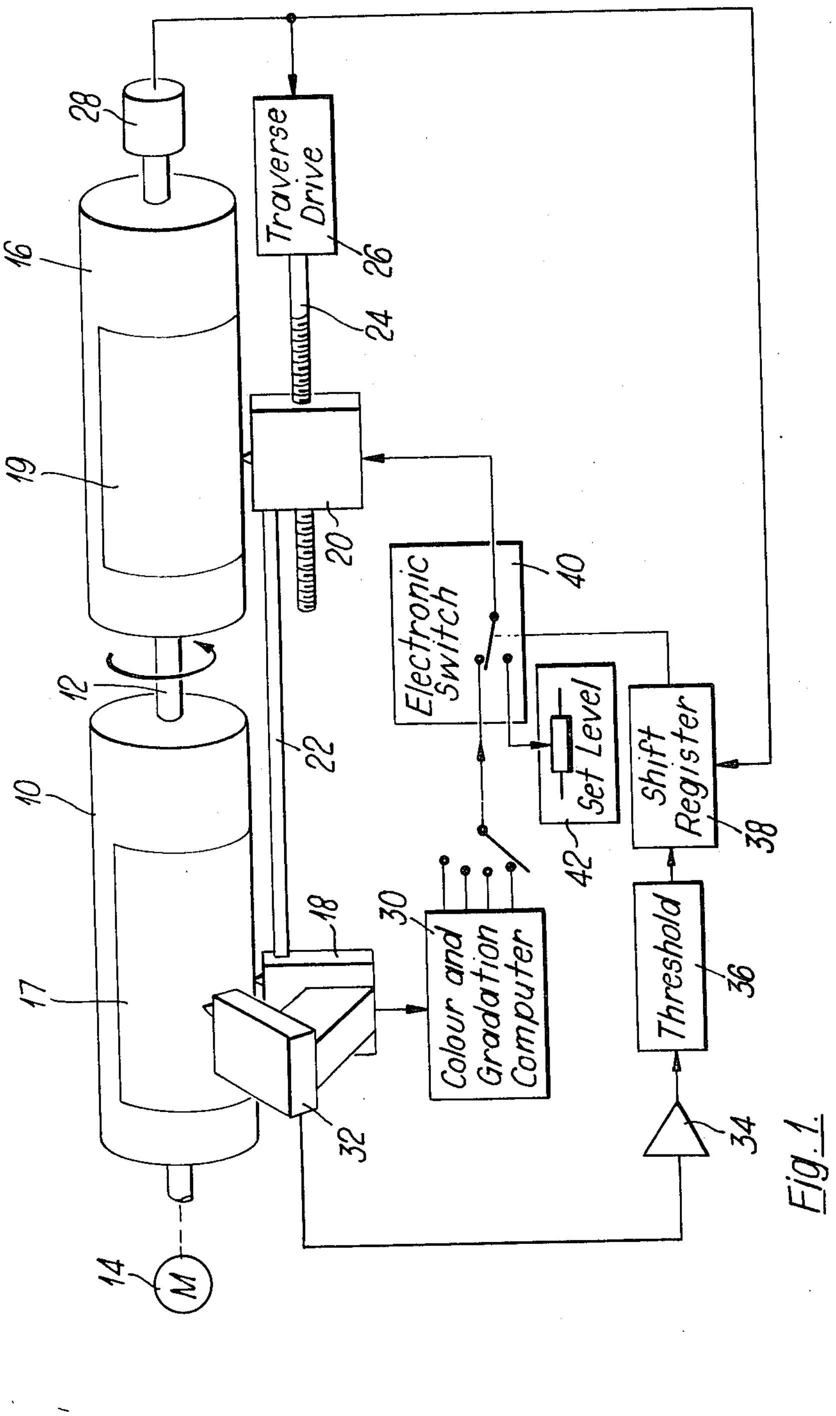
FIG. 1 illustrates diagrammatically a scanner embodying the present invention.

In FIG. 1, an original to be reproduced is placed on an input drum 10 mounted on a shaft 12 driven by a motor 14. In this example, an output drum 16 is mounted on the same shaft and therefore rotates in synchronism with the rotation of the input drum. A light sensitive sheet 19 is placed on the output drum and is exposed in accordance with density values obtained from the original on the input drum.

To obtain these density values, an analysing head 18 is mounted adjacent an original 17 on the drum 10. To expose the light sensitive sheet 19 an exposing head 20 is mounted adjacent drum 16. These two heads are mechanically linked through a member 22. The exposing head 20 has an internal screw thread which engages with the thread on a lead screw 24 so that upon rotation of the lead screw by a traverse drive 26, the heads 18 and 20 move in the longitudinal direction of the lead screw 24, which is parallel to the axis of rotation of the drums. The rate of rotation of the lead screw is governed by impulses from an incremental transducer 28 mounted on the shaft 12. As a consequence of the rotation of the drums and the slow longitudinal movement of the heads, the analysing head traces a helical path on the input drum and the exposing head traces an identical helical path on the output drum.

For colour reproduction, the analysing head 18 includes colour filters and three photo-electric devices which produce signals representing the densities of different colour components of the original. These three signals are applied to a colour and gradation computer 30 which can be of known form and forms no part of the present invention. This computer operates, for example, to compensate for the differences between the ink colours used in the final printing and the spectral characteristics of the filters used in the analysing head 18. In the example shown, this computer has four outputs and includes a circuit of known kind which, in response to the three colour component signals, generates a fourth "black printer" signal.

To sense the fluorescent marks, a furthr analysing head 32, having an effective aperture larger than that of the analysing head 18, is mounted in a fixed relationship to the head 18 such that the head 32 scans an area of the original which includes a point to be scanned by the analysing head after a predetermined fraction of a revolution of the drum 10. The signal produced by the head 32, representing the average density of the area, is applied through an amplifier 34 to a threshold circuit 36 of known type which generates a two-state control signal. The threshold is adjusted so that the control signal is at an "off" level when the area viewed by the head 32 is occupied by white paper or includes any tone darker than white, and is at an "on" level when all or part of the area is occupied by fluorescent paint. Because of the high level of fluorescence of the paint, an on signal is produced when only a part of the area is occupied by fluorescent paint, even though another part of the area is much darker, for example where this other part of the area includes a crack, where two pieces of copy are badly joined, which has not been effectively covered by the paint. The control signal from the threshold circuit 36 is applied to a shift register 38 acting as a delay circuit. Signals are passed along the shift register at a rate controlled by pulses from the incremental transducer 28. The control signals extracted from the shift register control an electronic switch 40. When the control signal is at the off level, the electronic switch is in the condition indicated in FIG. 1 and connects the selected colour printer or black printer output of computer 30 to the exposing head 20. The apparatus therefore operates in the normal way. However, when the control signal is at the on level, indicating the sensing of a fluorescent mark in the area which includes the points now scanned by the head 18, the electronic switch 40 changes over and connects a signal of predetermined level from a reference circuit 42 to the exposing head 20. This predetermined level may represent a "white paper" output.

In this way, defects in the original which is being scanned, provided they occur in area of uniform colour (for example white paper), are rendered invisible in the output. It will be seen that the use of fluorescent paint, which generates a "whiter than white" radiation, enables the removal of defects such as bad joins which would not be concealed merely by painting with white paint.

Figure 2:
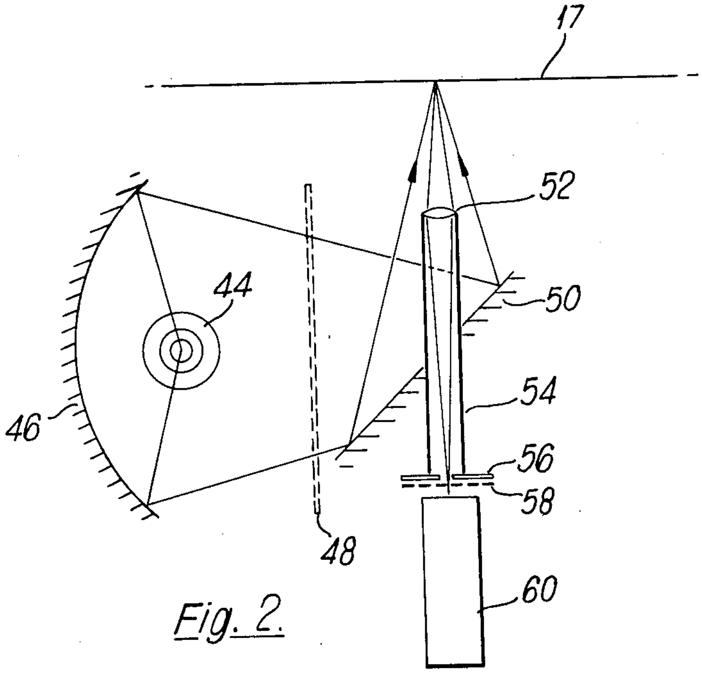
FIG. 2 illustrates the optical system of the head for sensing fluorescent marks in the apparatus of FIG. 1.

FIG. 2 illustrates the optical system of the fluorescent-mark sensing head. A concentrated-arc xenon lamp 44, rich in ultra-violet radiation, is positioned in front of an ellipsoidal mirror 46. The mirror 46 may advantageously be of a type which reflects ultra-violet and visible light but transmits infra-red radiation. The radiation reflected from the mirror passes through a filter 48 which prevents the passage of visible light and heat. The filter should transmit in the 350 to 450 nm range and cut off radiation beyond about 450 nm. A multi-layer interference filter is suitable. The radiation which passes through the filter is reflected by a plane mirror 50 towards the input drum, the input drum being spaced from the mirror at a distance such that the radiation reflected by the ellipsoidal mirror 46 is focussed at the surface of the original 17 on the input drum. Some of the light reflected from the original 17 passes through an objective lens 52 and travels along a lens tube 54 and through an aperture 56 and filter 58 to a photo-multiplier 60. As explained above, the output of the photo-multiplier is connected through the amplifier 34 to the threshold circuit 36 of FIG. 1. Reflecting optics are used in the illuminating system to avoid the attenuation of UV occurring in ordinary glass. A STADTLER 354 pen, which makes marks that fluoresce at about 520 nm when excited by the near ultra-violet, may be used to mark the original. The photo-multiplier filter is of a type which will transmit in the region of 500–550 nm and cut off shorter wavelengths. The photo-multiplier is of any convenient type sensitive in the 500 to 550 nm range.

Figure 3:
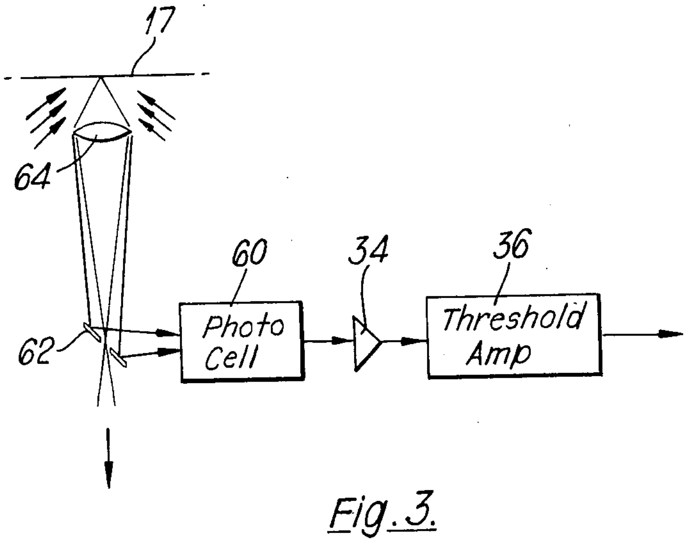
FIG. 3 shows diagrammatically an alternative form of scanner.

It is not essential to have an additional scanning system, for sensing the fluorescent marks, preceding the conventional analysing head. It is possible to scan the area including the point scanned by the analysing head simultaneously with the scanning of that point by the analysing head, using a beam splitting technique. It is also possible, as indicated in FIG. 3, to sense the presence of fluorescent paint in an annular area surrounding the point scanned by the conventional scanner. In FIG. 3, an annular mirror 62 is used to reflect light from the original 17, which has passed through a lens 64, on to a photo-multiplier 60, the output of which goes through the amplifier 34 to the threshold circuit 36 to provide the control signal. Light passing through the central aperture in the mirror 60 enters the conventional sensing system of the analysing head 18.

It will be appreciated that it is not necessary to reproduce the image on the light sensitive paper simultaneously with the scanning of the input drum. The signals from the computer 30 and threshold circuit 36 might be stored, for example, on magnetic tape and subsequently extracted at a rate controlled by the rotation of an output drum and used to expose a light sensitive surface.

Moreover, it is not essential to use a light sensitive sheet as an output surface; the exposing head can be replaced by an engraving head, for example a head using a laser beam or electron beam generator for forming cells in the surface of the drum 16. In such a case, an on signal from the threshold amplifier 36 stops the engraving of cells in the drum 16.

I claim:

1. Apparatus for use in the reproduction of an original, comprising a first scanning head including first photo-electric means for scanning an original, element by element, with a first aperture to provide a signal representing the density values of successively scanned elements on the original image, the image-representing signal constituting a control signal for a scanning image-reproduction device, the apparatus additionally comprising:

a second scanning head including second photo-electric means for scanning the said original with a second aperture larger than the first aperture and covering an area of the original larger than the element scanned by the first scanning head, the second scanning head being arranged to precede the first scanning head in the scanning of the original;

means responsive to a signal on said second photo-electric means having a value distinguishable from the image-representing signals to generate a replacement control signal;

replacement means responsive to a replacement control signal to replace an image-representing signal for a scanned element of the original by a signal having a predetermined value;

and a delay device to delay the operation of the replacement means in response to a distinguishable signal from the second photo-electric means, corresponding to an area scanned by the second scanning head, until the output of the first photo-electric means represents the density value of an element within said area;

whereby when defects in the original are so painted that they result in a distinguishable signal from said second photo-electric means, the signal of predetermined value constitutes the control signal for the scanning image-reproduction device for said element and the defects are omitted from the reproduction.

2. Apparatus in accordance with claim 1, in which the delay device is a shift register connected to receive signals derived from the second scanning head and arranged to be pulsed by signals generated in synchronism with the scanning of an output medium by an image-reproduction device.

3. Apparatus in accordance with claim 1, in which the second scanning head includes a radiation source emitting radiation of ultra-violet frequencies.

4. Apparatus in accordance with claim 3, in which the second scanning head includes filtering means for preventing the passage of visible light and heat from the source of radiation to the original.

5. Apparatus for use in the reproduction of an original, including a scanner having photo-electric means for scanning an original point by point with a first aperture to provide a signal representing the density values of successively scanned points on the original image, the image-representing signal constituting a control signal for a scanning image-reproduction device, the apparatus additionaly comprising:

second photo-electric means for scanning the said original with a second aperture larger than the first aperture; and means responsive to a signal from said second photo-electric means of a magnitude produced by scanning fluorescent paint and thereby distinguishable from the image-representing signals for an area of the original including said scanned point, and operative to replace the said image-representing signal for said scanned point by a signal having a predetermined value, whereby when defects in the original are so painted that they result in a distinguishable signal from the said second photo-electric means, the signal of predetermined value constitutes the control signal for the scanning image-reproduction device for the said point and the defects are omitted from the reproduction.

6. A method of reproducing an original in which the original is scanned point by point by means of a photo-electric device with a first aperture to derive an image-representing signal for controlling a scanning image-reproduction device, the method comprising the steps of:

painting over joins or other defects in the original in a preliminary step with a fluorescent paint;

thereafter scanning said original by means of a photo-electric device with an aperture larger than that used to obtain said image-representing signal; and replacing the image-representing signal for a scanned point by a signal of predetermined value when the output of the photo-electric device scanning with the larger aperture for an area including the said point has a value indicative of the presence of the said fluorescent paint within its field of view whereby the said signal of predetermined value thereafter constitutes a control signal for the scanning image-reproduction device for the said point.

* * * * *